US011287079B2

(12) United States Patent
Biswas et al.

(10) Patent No.: US 11,287,079 B2
(45) Date of Patent: Mar. 29, 2022

(54) SELF-HEALING BARRIER FILMS FOR VACUUM INSULATION PANELS

(71) Applicant: UT-Battelle LLC, Oak Ridge, TN (US)

(72) Inventors: Kaushik Biswas, Knoxville, TN (US);
Pengfei Cao, Knoxville, TN (US);
Tomonori Saito, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 33 days.

(21) Appl. No.: 16/746,149

(22) Filed: Jan. 17, 2020

(65) Prior Publication Data

US 2020/0232594 A1    Jul. 23, 2020

Related U.S. Application Data

(60) Provisional application No. 62/833,904, filed on Apr. 15, 2019, provisional application No. 62/795,102, filed on Jan. 22, 2019.

(51) Int. Cl.
*B32B 3/04*  (2006.01)
*B32B 5/18*  (2006.01)
(Continued)

(52) U.S. Cl.
CPC .............. *F16L 59/065* (2013.01); *B32B 3/04* (2013.01); *B32B 5/16* (2013.01); *B32B 5/18* (2013.01); *B32B 27/065* (2013.01); *B32B 27/12* (2013.01); *B32B 27/36* (2013.01); *B32B 37/185* (2013.01); *B32B 38/1858* (2013.01); *C08G 59/4042* (2013.01); *C08G 59/66* (2013.01); *C09D 167/02* (2013.01); *F25D 23/065* (2013.01);
(Continued)

(58) Field of Classification Search
CPC . B29C 73/163; B29C 73/22; B32B 2307/762; B32B 2307/7246; B32B 2607/00
See application file for complete search history.

(56) References Cited

U.S. PATENT DOCUMENTS 5,790,304 A    8/1998  Sanders
9,951,630 B2   4/2018  Hass
(Continued)

OTHER PUBLICATIONS

Moga et al. (Nano insulation materials for application in nZEB, Procedia Manufacturing 22(2018) 309-316.*
(Continued)

*Primary Examiner* — Alicia J Sawdon
(74) *Attorney, Agent, or Firm* — Warner Norcross + Judd LLP (57) ABSTRACT

A self-healing vacuum insulation panel and a method of manufacture are provided. The vacuum insulation panel includes a self-healing, multi-layer barrier film including a separator between a curing agent and a curable resin. Upon damage to the separator, the curing agent penetrates the separator due to a pressure differential across the barrier film and reacts with the curable resin to seal any cuts or punctures. The curing agent and the curable resin can be selected to have long term stability and a short reaction time with no need for external stimuli. As a result, the multi-layer barrier film can retain the internal vacuum and maintain a desirably low thermal conductivity using low-cost, commercially available epoxies and curing agents.

17 Claims, 8 Drawing Sheets

(51) Int. Cl.
| | |
|---|---|
| B32B 5/16 | (2006.01) |
| B32B 27/36 | (2006.01) |
| F16L 59/065 | (2006.01) |
| C08G 59/66 | (2006.01) |
| C09D 167/02 | (2006.01) |
| F25D 23/06 | (2006.01) |
| B32B 27/06 | (2006.01) |
| B32B 27/12 | (2006.01) |
| B32B 38/18 | (2006.01) |
| B32B 37/18 | (2006.01) |
| C08G 59/40 | (2006.01) |

(52) U.S. Cl.
CPC ....... *B32B 2250/40* (2013.01); *B32B 2255/10* (2013.01); *B32B 2255/205* (2013.01); *B32B 2255/26* (2013.01); *B32B 2255/28* (2013.01); *B32B 2266/06* (2013.01); *B32B 2307/304* (2013.01); *B32B 2307/7246* (2013.01); *B32B 2307/762* (2013.01); *B32B 2367/00* (2013.01); *F25D 2201/14* (2013.01)

(56) References Cited

U.S. PATENT DOCUMENTS

2009/0191402 A1*  7/2009  Beiermann ........... B32B 27/283
428/323
2017/0204695 A1*  7/2017  Bodhayan ............... B29C 73/22

OTHER PUBLICATIONS

X. Hillewaere, F. E. Prez, Fifteen chemistries for autonomous external self-healing polymers and composites. Progress in Polymer Science, 2015, 49-50, pp. 121-153.

D. Y. Zhu, M. Z. Rong, M. Q. Zhang, Self-healing polymeric materials based on microencapsulated healing agents: From design to preparation. Progress in Polymer Science, 2015, 49-50, pp. 175-220.

S. Zavada, N. R. McHardy, K. L. Gordon, T. F. Scott. Rapid, Puncture-Initiated Healing via Oxygen-Mediated Polymerization. ACS Macro Letters, 2015, 4, pp. 819-882.

S. Brunner, K.G. Wakili, Hints for an additional aging factor regarding the thermal performance of vacuum insulation panels with pyrogenic silica core. Vacuum, 2014, pp. 4-6.

U.S. Department of Energy, Building Technologies Office, Windows and Building Envelope Research and Development: Roadmap for Emerging Technologies, Feb. 2014, available online at http://energy.gov/sites/prod/files/2014/02/f8/BTO_windows_and_envelope_report_3.pdf.

R25 Polyisocyanurate Composite Insulation Material, 2016 Building Technologies Office Peer Review, U.S. Department of Energy, available online at http://energy.gov/sites/prod/files/2016/04/f30/31395_Biswas_040616-1020.pdf.

PRLog. R-50 Systems, LLC $200,000 in Construction Costs on GSA Project. 2016. Available online at https://www.prlog.org/12600699-50-systems-llc-saves-200000-in-construction-costs-ongsa-project.html.

U.S. Department of Energy. Energy I-Corps Cohort 3 Teams. Technology-To-Market. 2016. Available online at http://energy.gov/eere/technology-to-market/lab-corps-cohort-3-teams#onl-maiforbldgs.

Frey, Steffen, and Dirk Görlich. "FG/FxFG as well as GLFG repeats form a selective permeability barrier with self-healing properties." The EMBO journal 28.17 (2009): 2554-2567.

Dou, Yibo, et al. "Humidity-triggered self-healing films with excellent oxygen barrier performance." Chemical Communications 50.54 (2014): 7136-7138.

* cited by examiner

SELF-HEALING BARRIER FILMS FOR VACUUM INSULATION PANELS

CROSS-REFERENCE TO RELATED APPLICATIONS

This application claims the benefit of U.S. Provisional Application 62/795,102, filed Jan. 22, 2019, and U.S. Provisional Application 62/833,904, filed on Apr. 15, 2019, the disclosures of which are incorporated by reference in their entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to vacuum insulation panels and a method for increasing the durability of the same.

BACKGROUND OF THE INVENTION

Vacuum insulation panels include a gas-tight enclosure and a rigid core from which air and water vapor has been evacuated. Vacuum insulation panels are used for insulating refrigerators and freezers and provide extremely low thermal conductivity, particularly when compared to fibrous insulation materials, such as fiberglass, and polymer foams, such as foamed polystyrene. Vacuum insulation panels are also employed in shipping containers and refrigerated cargo areas of trains, trucks, and aircraft.

Vacuum insulation panels typically include a barrier film surrounding the rigid core to keep out gases and maintain a low thermal conductivity. The lower the thermal conductivity, the less heat flow for a given temperature difference. At internal core pressures below 10 mbar, for example, a fumed silica vacuum insulation panel can exhibit a thermal conductivity of 0.004 W/m/K. By contrast, current building insulation materials (cellular foams, fiberglass) have a thermal conductivity between 0.024 and 0.045 W/m/K, approximately an order of magnitude greater than the thermal conductivity for fumed silica vacuum insulation panels.

An increased emphasis in energy efficiency has prompted renewed interest in the development of vacuum insulation panels having low thermal conductivity, including vacuum insulation panels as a building insulation material. However, the development of vacuum insulation panels as a building insulation material has been hindered by their high cost and fragility. If a barrier film is damaged (punctured or cut), it allows air and/or water vapor to permeate into the core, resulting in a loss of vacuum and an increase in thermal conductivity to that of foam and fibrous materials. The integrity of the barrier film is therefore required in order to maintain a low thermal conductivity throughout the service life of each panel.

Accordingly, there remains a continued need for an improved vacuum insulation panel, and in particular, an improved vacuum insulation panel having a barrier film that is adapted to maintain a low internal pressure across a range of uses, for example as a building insulation material, refrigeration, and for other purposes.

SUMMARY OF THE INVENTION

A vacuum insulation panel and a method of manufacture are provided. The vacuum insulation panel includes a self-healing, multi-layer barrier film including a separator between a curing agent and a curable resin. Upon damage to the separator, the curing agent penetrates the separator due to a pressure differential across the barrier film and reacts with the curable resin to seal any cuts or punctures. The curing agent and the resin can be selected to have long term stability and a short reaction time with no need for external stimuli. As a result, the multi-layer barrier film can retain the internal vacuum and maintain a desirably low thermal conductivity using low-cost, commercially available epoxies and curing agents.

In one embodiment, the barrier film includes a curing agent and a curable resin applied as slurries to opposing sides of a metallized polymer separator. The curing agent is selected to have a sufficiently low viscosity to penetrate any gap within the separator and react with the curable resin prior to any significant change of pressure within the vacuum insulation panel. In the current embodiment, the curing agent is disposed exterior to the separator and the curable resin is disposed interior to the separator, however the curing agent and the curable resin can be disposed differently in other embodiments. The curing agent includes an imine-functional group or a thiol-functional group and the curable resin includes an epoxide-functional group and/or an acrylate-functional group. The curing agent and the curable resin may be in the form of a layer, each having a thickness of between 5 μm and 200 μm, inclusive. The barrier film also includes an outer protective layer and an inter protective layer to secure the curing agent, the separator, and the curable resin.

In another embodiment, a method for manufacturing a self-healing vacuum insulation panel is provided. The method includes placing an insulating core material within a barrier envelope to define an enclosure, evacuating the enclosure to form a vacuum therein, and sealing the enclosure along a perimeter of the barrier envelope to form the vacuum insulation panel, wherein a perforation of the barrier envelope causes an internal curing agent to react with an uncured resin to seal the perforation. The method further includes forming the barrier envelope by applying the curing agent on a first side of the separator and applying the curable resin on a second side thereof, the curing agent and the curable resin each being applied as a slurry. Evacuating the enclosure includes reducing the atmosphere therein to less than 10 mbar, further optionally about 0.1 mbar or less depending on the core material.

In these and other embodiments, a breach of the barrier film results in a reaction between a curing agent and a curable resin to rapidly seal the barrier film before any significant loss of the panel's internal vacuum. By non-limiting example, imine-epoxy and thiol-epoxy embodiments were found by the inventors to have a short reaction time with no need for external stimuli. The ability to preserve a system vacuum, and thereby preserve the low thermal conductivity of vacuum insulation panels, renders the present invention especially well-suited for use as a building material and for conventional refrigeration systems, among other applications.

These and other features and advantages of the present invention will become apparent from the following descrip-

DETAILED DESCRIPTION OF THE CURRENT EMBODIMENTS

Figure 1:
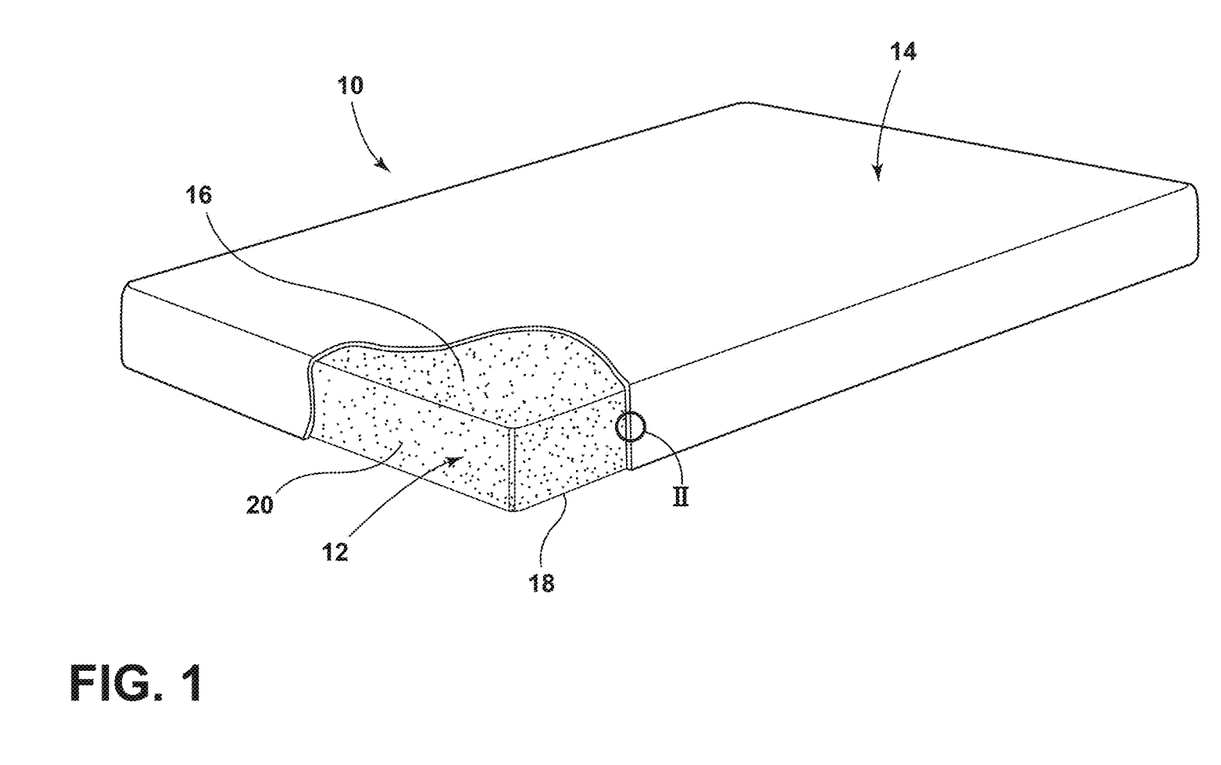
FIG. 1 is a perspective cut-away view of a vacuum insulation panel including a barrier film in accordance with one embodiment.

With reference to FIG. 1, a vacuum insulation panel in accordance with one embodiment is illustrated and designated 10. The vacuum insulation panel 10 includes an insulating core 12 and a barrier envelope 14 that surrounds the insulating core 12. As discussed below, the barrier envelope 14 is a self-healing, multi-layer barrier film including a curing agent and a curable resin. A breach of the barrier film causes the curing agent to react with the curable resin to rapidly seal any cuts or punctures, thereby preserving the internal vacuum. Each such feature of the vacuum insulation panel 10 is discussed below.

The insulating core 12 can be formed from any suitable material having a low thermal conductivity. For example, the insulating core 12 can be formed from insulating particulate matter, including powders, fibers, and combinations of powders and fibers. Suitable insulating powders can include fumed silica or silica aerogel, while suitable insulating fibers can include fiberglass. The insulating core 12 can alternatively include open celled foams, for example polystyrene foam and polyurethane foam. In the illustrated embodiment, the insulating core includes a rectangular shape with a thickness of between 5 mm and 100 mm, further optionally 20 mm to 40 mm, but can include other shapes and thicknesses in other embodiments. As shown in FIG. 1, the insulating core 12 includes an upper surface 16, a lower surface 18, and side surfaces 20. The insulating core 12 is fully enclosed within the flexible barrier envelope 14 and evacuated and sealed to maintain the applied vacuum therein, such that the barrier envelope 14 fully surrounds each surface 16, 18, 20 of the insulating core 12.

Figure 2:
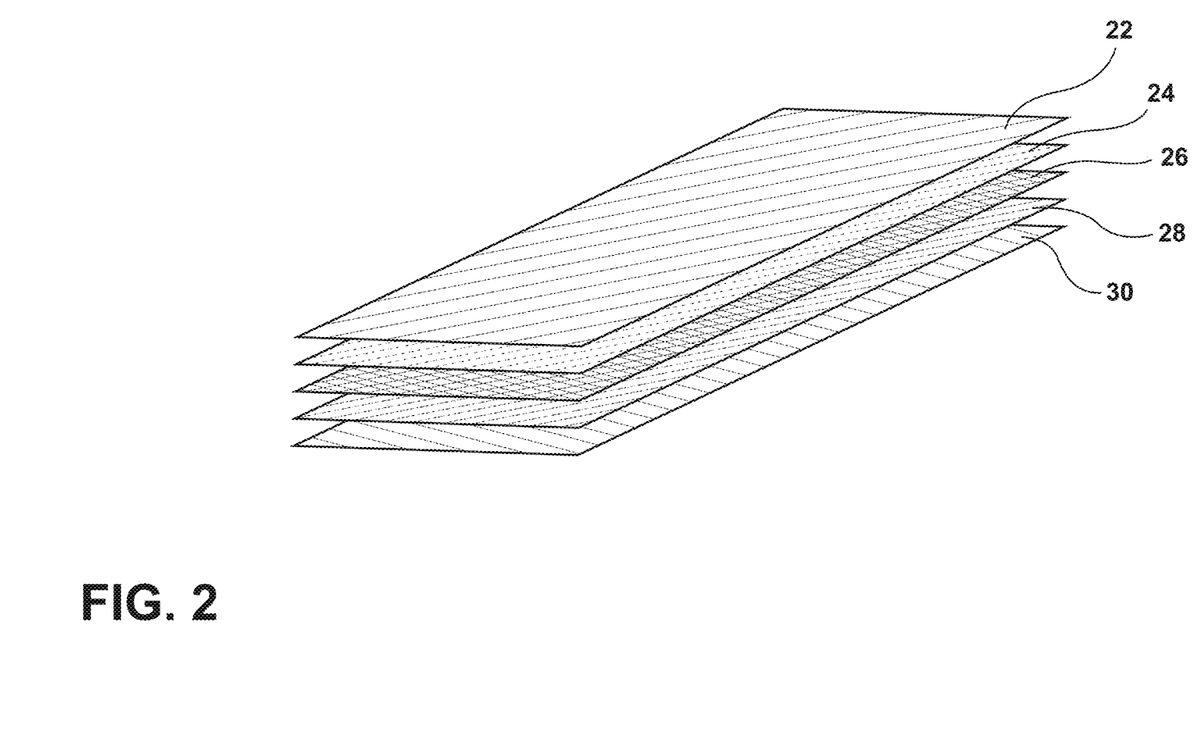
FIG. 2 is an expanded view of the barrier film of FIG. 1 including a curable resin, a separator, and a curing agent.

As shown in FIG. 2, the barrier envelope 14 includes an outer layer 22, a curing agent 24, a separator 26, a curable resin 28, and an inner layer 30. The outer layer 22 and the inner layer 30 can include a plastic film liner polymer, for example high impact polystyrene. The outer layer 22 and the inner layer 30 can include other laminates other embodiments, for example an oxygen barrier and a moisture barrier. As noted above, the barrier envelope 14 also includes a curing agent 24, a separator 26, and a curable resin 28. The curing agent 24 and the curable resin 28 are selected to ensure that if the separator 26 is punctured, the curing agent 24 and the curable resin 28 mix and react to expand and seal the puncture before significant loss of the vacuum from within the vacuum insulation panel 10. For example, the curing agent 24 is selected to have a low viscosity to readily penetrate the separator 26. That is, the existing pressure differential between the ambient (outer) side and vacuum (inner) side will force the lower viscosity curing agent 24 to flow across the perforated separator 26 and react with the curable resin 28. The curable resin 28, by contrast, is selected to have a sufficiently high viscosity to prevent it from flowing across the inner layer 30, for example a polystyrene liner which separates the curable resin 28 from the insulating core 12.

As noted above, the curing agent 24 is selected to have a low viscosity while readily reacting with the curable resin 28 with no external stimuli. In the current embodiments, the curing agent 24 can include a nitrogen-containing functional group (for example an imine-functional group, e.g., polyethyleneimine (PEI), or an amine-functional group) or a thiol-functional group, for example a thiol mercaptan, however the curing agent 24 can include other compounds in other embodiments. The curable resin 28 can include an epoxide group, for example Epon Resin 8111 available from Hexion, Inc., optionally including an acrylate-functional group. The curing agent 24 and the curable resin 28 are disposed on opposite sides of the separator 26, optionally as a thin coating of between 5 µm and 200 µm, inclusive, further optionally with a thickness of between 25 µm and 75 µm, inclusive. The separator 26 generally includes any material selected to maintain the internal vacuum while not being overly brittle. The separator 26 is generally capable of isolating the curing agent 24 from the curable resin 28 when not punctured. The separator 26 can include a polymer, for example regular polyethylene terephthalate (PET) or metallized polyethylene terephthalate (mPET). The separator 26 can include a high flexural modulus with ductility to reduce the development of micro-cracks and to limit crack propagation. Further by example, the separator 26 can include a flexural modulus between 1 MPa and 1000 MPa, inclusive. Collectively, the barrier envelope 14 is wrapped around the insulating core 12 and sealed to itself, optionally with the application of heat around the edges of the envelope 14.

The vacuum insulation panel 10 is formed by placing the insulating core 12 within the self-healing barrier envelope 14, evacuating the barrier envelope 14 to form a gas-tight enclosure around the insulating core 12, and sealing the barrier envelope 14 along a perimeter thereof. As noted above, the insulating core 12 includes an insulating particulate matter or an open celled foam, and the barrier envelope 14 includes a separator 26 between a curing agent 24 and a curable resin 28. Evacuating the barrier envelope 14 to form a gas-tight enclosure is performed with a vacuum pump to reduce the internal pressure to much less than ambient pressure, for example less than 15 mbar, further optionally less than 10 mbar, and still further optionally about 1 mbar. As the barrier envelope 14 is evacuated, the inner layer 30 of the barrier envelope 14 will be in contact with the outer surface of the insulating core 12. In addition, the barrier envelope 14 can be formed by applying the curing agent 24 and the curable resin 28 as slurries on opposing sides of the separator, optionally as thin coatings of between 5 µm and 200 µm, inclusive, further optionally with a thickness of between 60 μm and 80 μm, inclusive. The separator 26 (with applied slurries 24, 28) is then sandwiched between the outer layer 22 and the inner layer 30, optionally according to roll-to-roll processing techniques to manufacture the multi-layer barrier film 14 with a commercially viable throughput.

EXAMPLES

Figure 3:
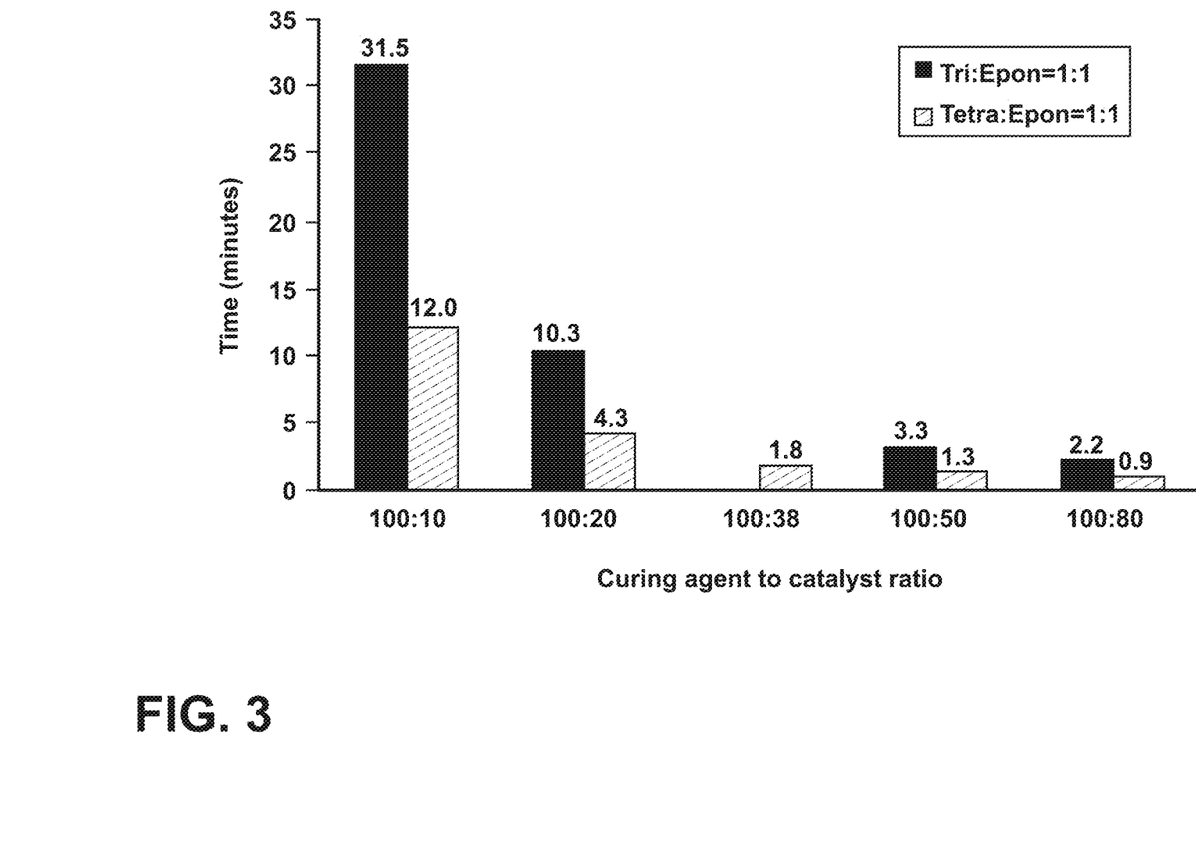
FIG. 3 is a bar graph illustrating reaction times between a curable resin and multiple curing agents.

In one non-limiting example, the reaction kinetics of selected curing agents and resins were evaluated to determine viability as a barrier envelope for a vacuum insulation panel. FIG. 3 depicts the results of reaction trials of an epoxy resin (Epon 8111) with two different curing agents and different ratios of curing agent to epoxy resin. The reactions were performed with the addition of a solvent (acetone) to achieve homogeneous mixing of the epoxy resin and curing agents. With a 1:1 ratio of trimethylolpropane tris(3-mercaptopropionate) and Epon 8111, a minimum reaction time of 2 minutes and 12 seconds was obtained at a curing agent to epoxy ratio of 100:80. With a 1:1 ratio of tetramethylolpropane tris(3-mercaptopropionate) and Epon 8111, a minimum reaction time of less than 2 minutes was obtained at a curing agent to epoxy ratio of 100:38 or higher for curing agent and epoxy. Investigation of polyethyleneimine (PEI) and Epon 8111 in a 1:1 ratio revealed a reaction time of less than one minute. This fast reaction is attributed to PEI being quick to solidify by crosslinking by virtue of its larger molecular weight (25,000 g/mol) and the presence of numerals imine groups per PEI molecule.

Figure 4:
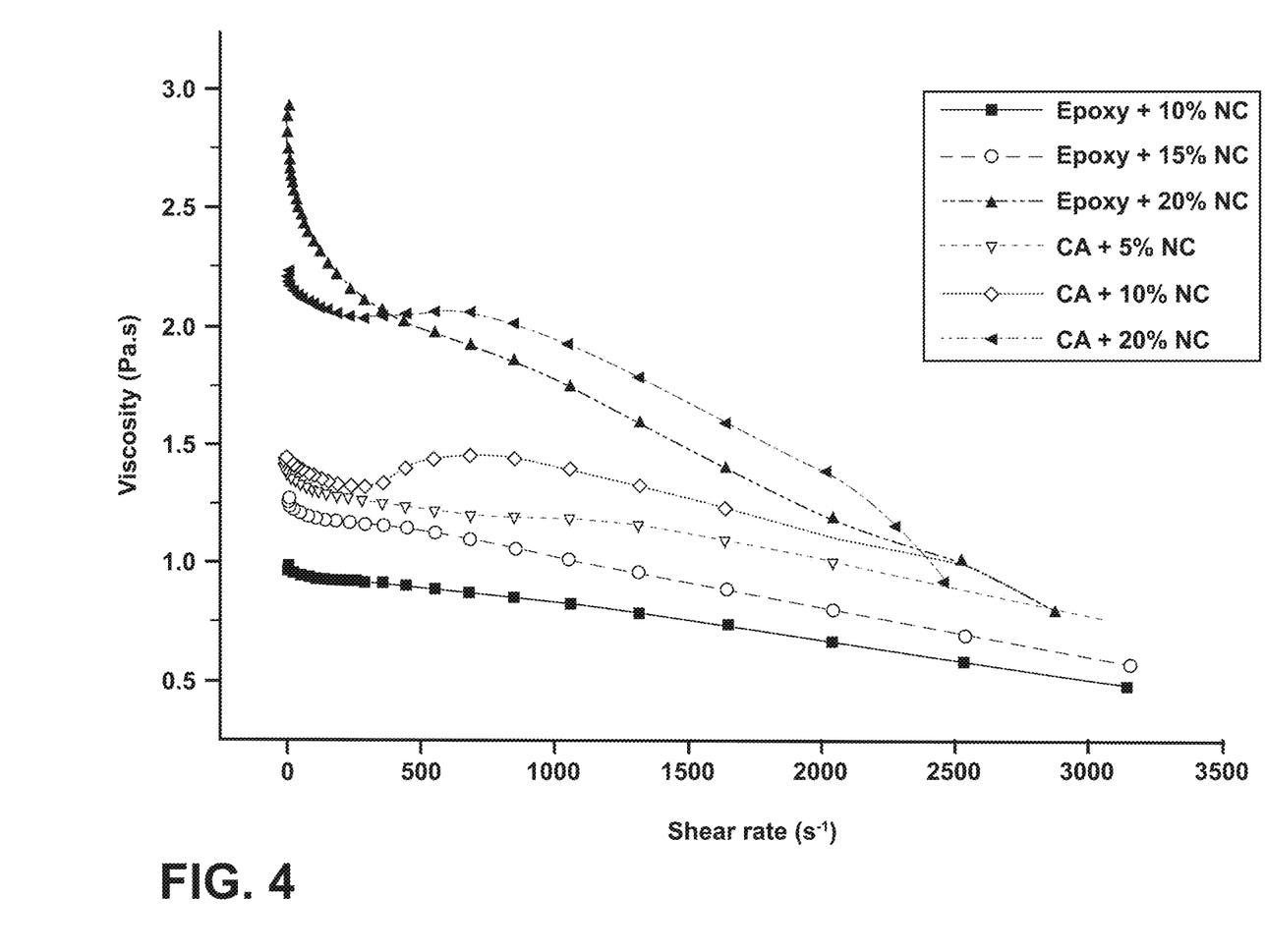
FIG. 4 is a graph illustrating viscosity as a function of slot-side coating sheer rates for various curable resins and curing agents.
Figure 5:
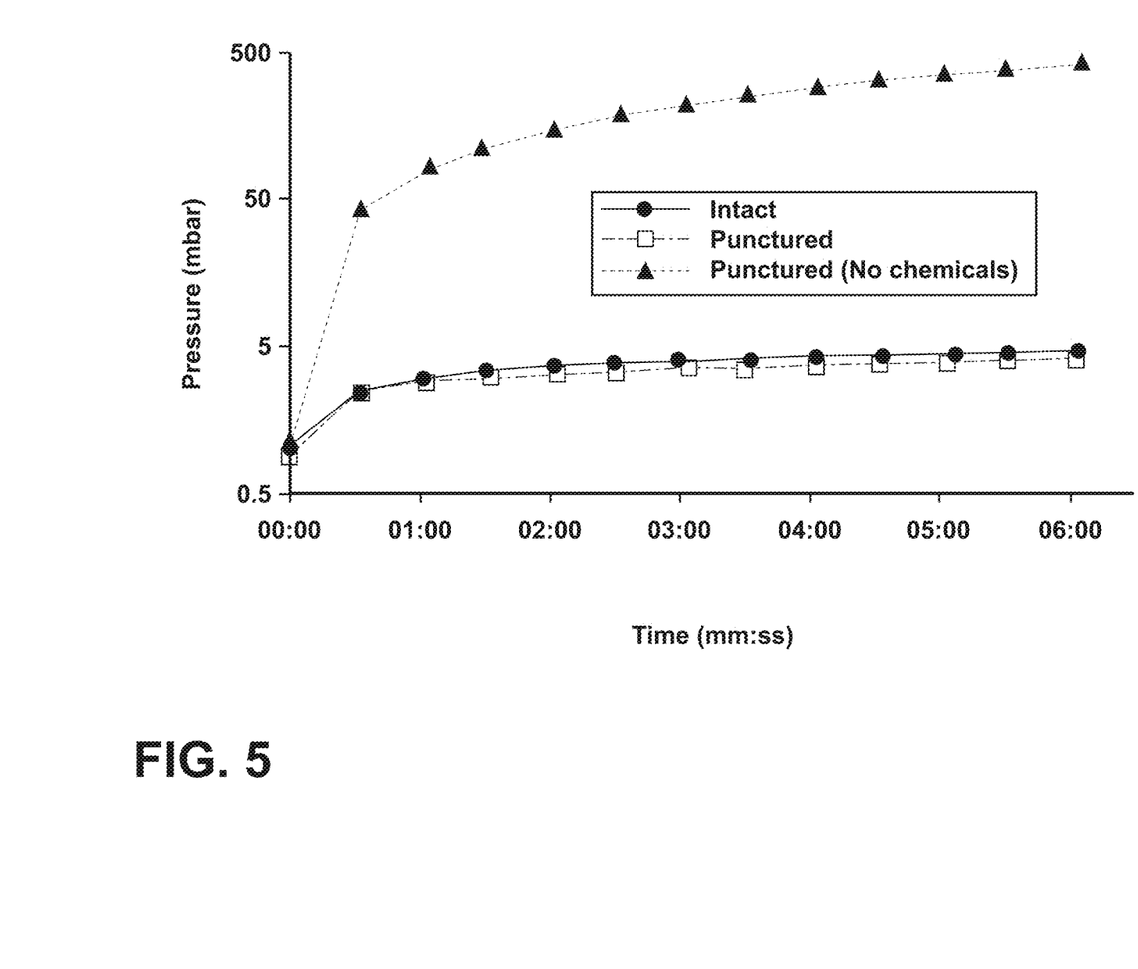
FIG. 5 is a graph illustrating vacuum retention for a single-puncture test of a barrier film in accordance with one embodiment.
Figure 6:
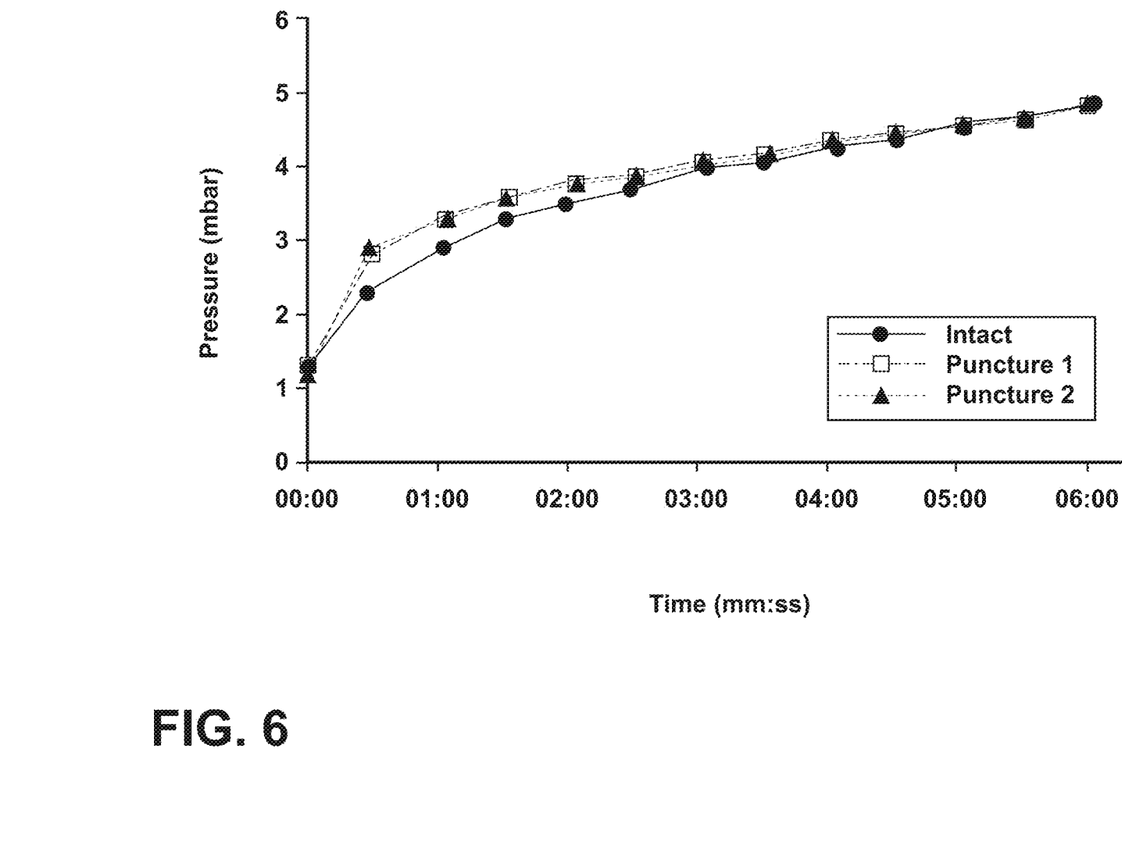
FIG. 6 is a graph illustrating vacuum retention for a multi-puncture test of a barrier film in accordance with one embodiment.
Figure 7:
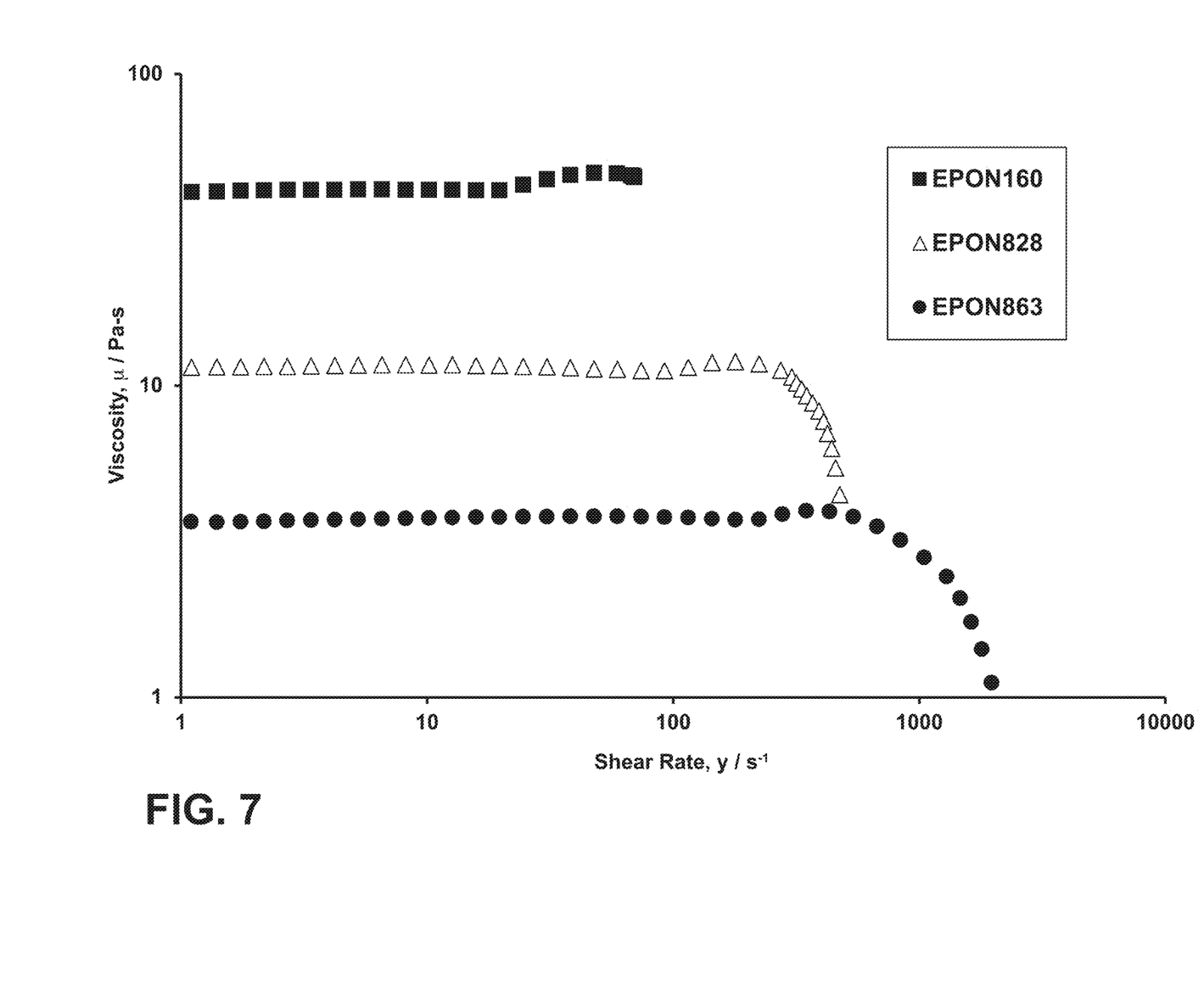
FIG. 7 is a graph illustrating viscosity of epoxies as a function of slot-coating sheer rates.

In a further non-limiting example, multiple slurries of epoxies (Epon 8111) and curing agents (PEI) with different weight percentages of nanoclay (NC) were tested to characterize their viscosities as a function of shear rate. These slurries were prepared for roll-to-roll manufacturing trials using a slot die coating machine at typical slot-die coating shear rates (100-1000 $s^{-1}$). FIG. 4 depicts the measured viscosities for epoxies and curing agents (CA) at different shear rates, each being below 5 Pa-s, demonstrating good coating deposition and thickness control. Film samples were then created by coating mPET and coextruded polymer films with an epoxy slurry on the vacuum side and a curing agent slurry on the atmosphere side. These samples were then puncture tested to verify their ability to self-heal and maintain low system pressure. In particular, a 6×6 cm sample was clamped between glass plates having 2.54 cm holes on either side while exposing the barrier film to ambient atmosphere on one side and (initially) a vacuum atmosphere (1 mbar) on the other side. FIG. 5 depicts the vacuum atmosphere over time for a barrier film subject to perforation by a screw ("Punctured") as compared with an intact sample ("Intact") and a sample lacking an epoxy and a curing agent ("Punctured (No chemicals)"). FIG. 6 depicts the vacuum atmosphere over time for a barrier film subject to a second puncture ("Puncture 2"). In both tests, the epoxy and the curing agent in the self-healing barrier film reacted sufficiently quickly to seal the perforation while maintaining the vacuum at the same level as the intact film as a function of time.

Figure 8:
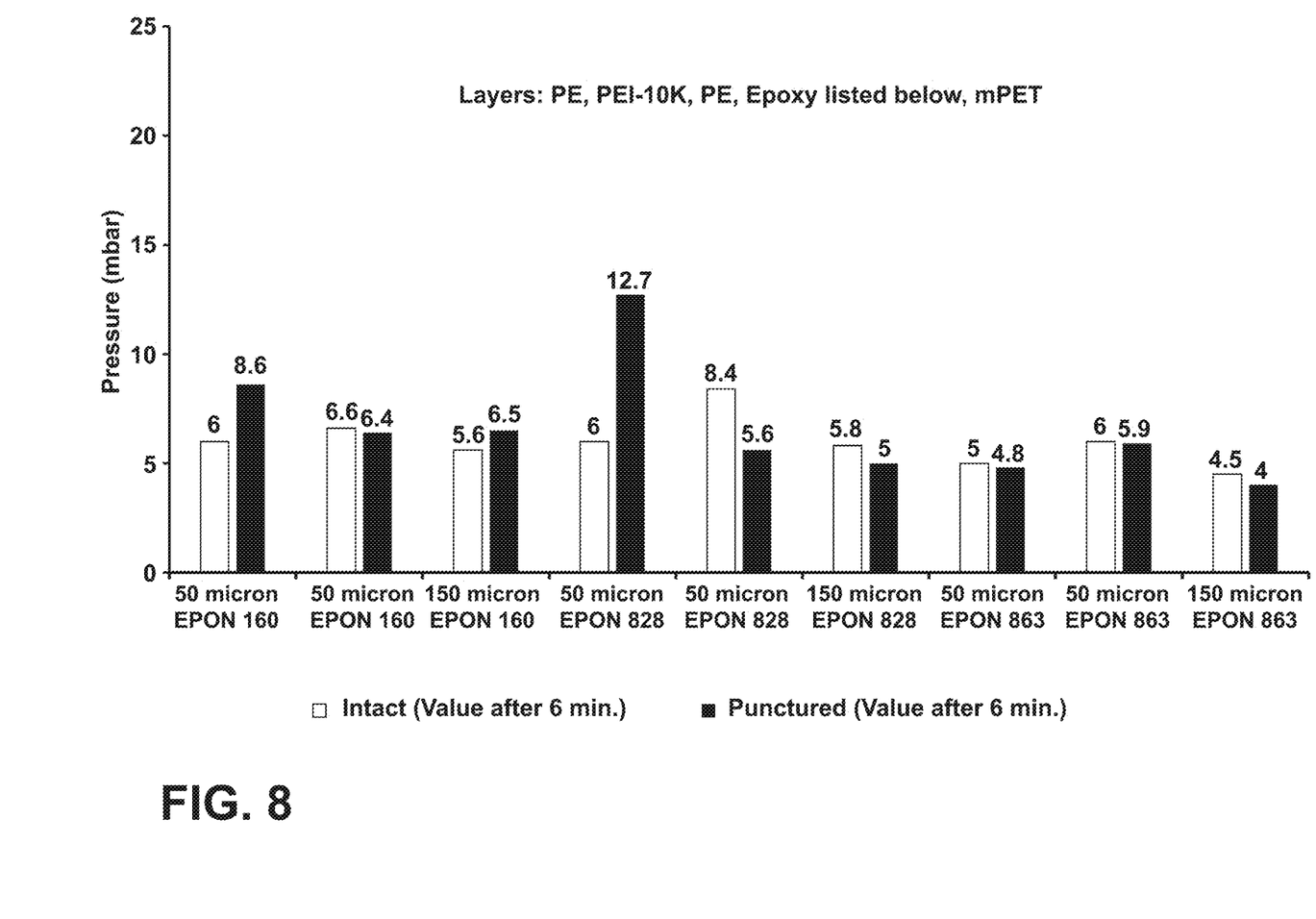
FIG. 8 is a graph illustrating vacuum retention for a multi-puncture test of a barrier film with other types of epoxies as an epoxy layer in accordance with one embodiment.

In another example, different epoxy resins were explored. The explored resins included Epon 160, Epon 282, and Epon 863, available from Hexion, Inc. The rheology of the three selected resins are evaluated in FIG. 8. Due to processability on the coating, Epon 160 was diluted with NMP or MEK for making the epoxy layer. The reaction time of the three epoxies at a 1:1 ratio with PEI was below two minutes. To demonstrate the self-healing properties and ability to maintain the vacuum in puncture, 6×6 cm samples were made with varying thicknesses. Each sample included a PE outer protective layer, a PEI curing agent, a PE separator, an epoxy, and an mPET inner protective layer. FIG. 8 compares the sample in the specimen chamber after six minutes without perforation by a nail and by the sample being punctured with a nail. Each sample tested was found to quickly seal around the nail puncture without losing significant pressure.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A self-healing vacuum insulation panel comprising:
   an insulating core material; and
   a gas-impermeable barrier envelope surrounding the insulating core material and forming an enclosure to maintain an applied vacuum therein,
   wherein the gas-impermeable barrier envelope includes a curing agent, a curable resin, and a separator therebetween, such that a perforation of the separator causes the curing agent to react with the curable resin to seal the gas-impermeable barrier envelope, and wherein the curing agent and the curable resin each define a layer including a thickness of between 5 μm and 200 μm inclusive.

2. The self-healing vacuum insulation panel of claim 1 wherein the curing agent is disposed exterior to the separator and the curable resin is disposed interior to the separator.

3. The self-healing vacuum insulation panel of claim 1 wherein the curing agent includes an imine-functional group and wherein the curable resin includes an epoxide-functional group.

4. The self-healing vacuum insulation panel of claim 1 wherein the curing agent includes a thiol-functional group and wherein the curable resin includes an epoxide-functional group.

5. The self-healing vacuum insulation panel of claim 1 wherein the curing agent and the curable resin each include a slurry applied to opposing sides of the separator.

6. The self-healing vacuum insulation panel of claim 1 wherein the insulating core material comprises insulating powders or insulating fibers.

7. The self-healing vacuum insulation panel of claim 1 wherein the gas-impermeable barrier envelope further includes an outer protective layer positioned adjacent of the curing agent.

8. The self-healing vacuum insulation panel of claim 7 wherein the gas-impermeable barrier envelope further includes an inner protective layer positioned adjacent of the curable resin.

9. The self-healing vacuum insulation panel of claim 1 wherein the separator includes metalized polyethylene terephthalate.

10. A self-healing vacuum insulation panel comprising:
    an insulating core material; and
    a gas-impermeable barrier envelope surrounding the insulating core material and forming an enclosure to maintain an applied vacuum therein,
    wherein the gas-impermeable barrier envelope includes a curing agent, a curable resin, and a separator therebetween, such that a perforation of the separator causes the curing agent to react with the curable resin to seal the gas-impermeable barrier envelope, and wherein the separator includes metalized polyethylene terephthalate.

11. The self-healing vacuum insulation panel of claim 10 wherein the curing agent is disposed exterior to the separator and the curable resin is disposed interior to the separator.

12. The self-healing vacuum insulation panel of claim 10 wherein the curing agent includes an imine-functional group and wherein the curable resin includes an epoxide-functional group.

13. The self-healing vacuum insulation panel of claim 10 wherein the curing agent and the curable resin each include a slurry applied to opposing sides of the separator.

14. The self-healing vacuum insulation panel of claim 10 wherein the insulating core material comprises insulating powders or insulating fibers.

15. The self-healing vacuum insulation panel of claim 10 wherein the gas-impermeable barrier envelope further includes an outer protective layer positioned adjacent of the curing agent.

16. The self-healing vacuum insulation panel of claim 15 wherein the gas-impermeable barrier envelope further includes an inner protective layer positioned adjacent of the curable resin.

17. The self-healing vacuum insulation panel of claim 10 wherein the curing agent and the curable resin each define a layer including a thickness of between 5 μm and 200 μm, inclusive.

\* \* \* \* \*